US009159168B2

(12) United States Patent
Elber

(10) Patent No.: US 9,159,168 B2
(45) Date of Patent: Oct. 13, 2015

(54) METHODS AND SYSTEMS FOR GENERATING A DYNAMIC MULTIMODAL AND MULTIDIMENSIONAL PRESENTATION

(71) Applicant: Gershon Elber, Haifa (IL)

(72) Inventor: Gershon Elber, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 298 days.

(21) Appl. No.: 13/657,972

(22) Filed: Oct. 23, 2012

(65) Prior Publication Data

US 2013/0100133 A1 Apr. 25, 2013

Related U.S. Application Data

(60) Provisional application No. 61/550,409, filed on Oct. 23, 2011.

(51) Int. Cl.
*G06T 19/20* (2011.01)

(52) U.S. Cl.
CPC ......... *G06T 19/20* (2013.01); *G06T 2219/2008* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

| 6,556,199 | B1* | 4/2003 | Fang et al. ................... 345/424 |
| 7,721,209 | B2 | 5/2010 | Tilton | |
| 2002/0070932 | A1* | 6/2002 | Kim ............................... 345/419 |
| 2002/0129058 | A1* | 9/2002 | Story et al. .................... 707/513 |
| 2004/0130566 | A1 | 7/2004 | Banerjee et al. | |
| 2005/0012743 | A1* | 1/2005 | Kapler et al. ................. 345/419 |
| 2007/0052724 | A1* | 3/2007 | Graham et al. ............... 345/620 |
| 2009/0125802 | A1* | 5/2009 | Chen et al. .................... 715/234 |
| 2011/0066928 | A1* | 3/2011 | Karlsson ....................... 715/202 |
| 2011/0169927 | A1* | 7/2011 | Mages et al. .................... 348/51 |
| 2012/0120053 | A1* | 5/2012 | Dong et al. .................... 345/419 |

OTHER PUBLICATIONS

Catmull "A Subdivision Algorithm for Computer Display of Curved Surfaces", A Dissertation Submitted to the Faculty of the University of Utah in Partial Fulfillment of the Requirements for the Degree of Doctor of Philosophy, Department of Computer Science, University of Utah, Dec. 1974.

(Continued)

*Primary Examiner* — Daniel Hajnik

(57) ABSTRACT

A computerized method of creating a presentation of multidimensional objects in a multidimensional presentation space. The method comprises providing a core element which applies any of functions on a multidimensional object in a multidimensional presentation space, providing a plurality of adaptation components each contains instructions for converting any media object of another of different media types each to a multidimensional object in the multidimensional presentation space, receiving a media object, identifying a matching adaptation component from the adaptation components according to a respective media type of the media object, converting the media objects into a multidimensional object in the multidimensional presentation space using the matching adaptation component, and applying any of the functions on the multidimensional object, using the core element, according to a user selection.

32 Claims, 7 Drawing Sheets

(56) References Cited

OTHER PUBLICATIONS

Surazhsky et al. "Arbitrary Precise Orientation Specification for Layout of Text", Proceedings of the 8th Pacific Conference on Computer Graphics and Applications, Hong Kong, China, Oct. 3, 2000, p. 80-86, 2000.

Surazhsky et al. "Artistic Surface Rendering Using Layout of Text", Computer Graphics Forum, 21(2): 99-110, 2002.

\* cited by examiner

METHODS AND SYSTEMS FOR GENERATING A DYNAMIC MULTIMODAL AND MULTIDIMENSIONAL PRESENTATION

RELATED APPLICATION/S

This application claims the benefit of priority under 35 USC §119(e) of U.S. Provisional Patent Application No. 61/550,409 filed Oct. 23, 2011, the contents of which are incorporated herein by reference in their entirety.

FIELD AND BACKGROUND OF THE INVENTION

The present invention, in some embodiments thereof, relates to multi data-types presentation and, more particularly, but not exclusively, to methods and systems for generating a multi dimensional dynamic and interactive presentation.

Contemporary computer based presentation software (CBPS) offers users with discrete two-dimensional mostly static fixed-size-slides which are presented in a linear manner (sequential), as a common slide. A non sequential presentation of slides, for example when a reference to previous write-ups and/or drawings is made, is not supported with ease by most of the CBPSs. Similarly a hierarchy of slide is not supported by CBPS. Such a non sequential or hierarchical presentation is relatively common when a lecturer uses traditional non-computer visual aids such as blackboards and whiteboards. Further, in traditional lectures, the restriction to discrete fixed-size-slides is non-existing. Moreover, using a sequential presentation of slides prevents from the lecturer to incrementally build an idea at a rate, direction, and/or resolution which is determined in real time, based on a feedback from the audience, not to say update/modify the presented content in real time and with ease. Finally, CBPS supports a predefined set of data-type modalities and allow the modalities access all the way to the display and interaction level, creating an inconsistent display and/or incoherent data type support and interaction.

During the last years, a number of systems and methods have been developed to enhance presentation. For example, U.S. Patent Application No. 2004/0130566, filed on Jun. 6, 2003 describes method and system is described for the generation of meta-slides which can be used for multidimensional presentations and documentation. Meta-slides represent an organizing principle suitable for multidimensional virtual reality and multimedia (i.e. video, audio, text and images) content creation. Multiple avatars, actors, objects, text and slides are assembled in a meta-slide performing actions synchronously or asynchronously. The meta-slides and scenes are edited on a time line. The term scene refers to herein to presentation content, geometric or not geometric. The user can interact and dynamically update the content of the presentation during the content playback in a playback window. The playback window and meta-slides can become part of an internet browser or remain standalone. U.S. Pat. No. 7,721,209, filed on Apr. 13, 2009 describes techniques for accomplishing slide transitions in a presentation are disclosed. In accordance with these techniques, objects within the slides are identified, automatically or by a user, and each object is individually manipulable during slide transitions. The individual manipulation applied to each object during a transition may also be automatically determined or specified by a user. In certain embodiments, the persistence of an object between slides may be taken into account in the manipulation of the object during slide transition.

SUMMARY OF THE INVENTION

According to some embodiments of the present invention there is provided a computerized method of creating a presentation of a plurality of multidimensional objects having three dimension or more in a multidimensional presentation space, comprising: providing a core element which applies any of a plurality of functions on a multidimensional object in a multidimensional presentation space, the plurality of functions comprising resizing the multidimensional object, coloring at least part of the multidimensional object, and maneuvering the multidimensional object in the multidimensional presentation space, providing a plurality of adaptation components each contains instructions for converting any media object of another of a plurality of different media types to a multidimensional object in the multidimensional presentation space, receiving a media object, identifying a matching adaptation component from the plurality of adaptation components according to a respective media type of the media object, converting the received media object into a multidimensional object in the multidimensional presentation space using the matching adaptation component, and applying any of the plurality of functions on the multidimensional object, using the core element, according to a user selection.

Optionally, each adaptation component comprises instructions to manipulate another member of a group consisting of: text, an image, a drawing, a video file, a CT scan, a mechanical or biological model, a diagram, or other visual computer graphic (CG) element, and/or the like.

Optionally, the method further comprises updating a display of the multidimensional presentation space to display the outcome of applying one of the plurality of functions on the multidimensional object.

Optionally, the method further comprises an intuitive scheme to insert, modify and delete views in the multidimensional scene.

Optionally, the method comprises applying a plurality of functions on the multidimensional object, using the core element, according to a plurality of user selections so as to allow presenting continuous changes to the multidimensional presentation space.

Optionally, the method further comprises animating the multidimensional presentation space according to the applied function.

According to some embodiments of the present invention there is provided a computerized method of creating a presentation of a plurality of multidimensional objects in a multidimensional presentation space. The method comprises presenting to a user with indicators of a plurality of manipulation function, providing a plurality of adaptation components each contains instructions for applying each of the plurality of manipulation functions on a multidimensional object of another of a plurality of different media types, receiving a user selection indicative of at least one of a plurality of multidimensional objects in a multidimensional presentation space and of one of the plurality of manipulation functions, identifying a matching adaptation component from the plurality of adaptation components according to a respective media type of the at least one multidimensional object, applying, using a processor, respective the instructions from the matching adaptation component to manipulate the selected multidimensional object according to the selected manipulation function, and generating presentation instructions of the multidimensional presentation space with the manipulated multidimensional object.

Optionally, the receiving comprises receiving a plurality of (geometry) objects of a plurality of media types and converting the plurality of visible objects into the plurality of common multidimensional objects using the plurality of adaptation components.

Optionally, the plurality of manipulation functions comprise members of a group consisting of object selection, object movement, object enlargement, object deformation, a reaction to an identified event, and/or the like.

Optionally, each the adaptation component comprises instructions to manipulate another member of a group consisting of: text, an image, a drawing, a video file, a CT scan, a mechanical or biological model, a diagram, other visual computer graphic (CG) element, and/or the like.

Optionally, the plurality of multidimensional objects comprises at least one text object and at least one visual computer graphics object.

Optionally, the generating comprises recoding a display of the multidimensional presentation space while the selected multidimensional object is manipulated according to the respective instructions.

Optionally, the instructions define when to manipulate the selected multidimensional object along a timeline; the presentation instructions are adapted to instruct the presentation of a manipulation of the multidimensional object according to the timeline.

Optionally, the user selection indicative of a period in a timeline wherein a manipulation should occur according to the selected manipulation function.

Optionally, the method further comprises interfacing with a hardware component using hardware component interface instructions in the matching adaptation component according to the user selection.

Optionally, at least one multidimensional object comprises a plurality of multidimensional objects of different media types.

Optionally, boundaries of the multidimensional presentation space limits manipulation of the selected multidimensional object.

Optionally, the presentation instructions allow presenting continuous changes to the multidimensional presentation space.

Optionally, the presentation instructions allow presenting a non sequential path of changes in the multidimensional presentation space.

Optionally, the presentation instructions animate the multidimensional presentation space.

According to some embodiments of the present invention there is provided a computerized method of creating a presentation of a plurality of multidimensional objects having three dimensions or more in a multidimensional presentation space. The method comprises presenting to a user a plurality of manipulation functions, providing a first adaptation component which contains instructions for applying each of the plurality of manipulation functions on textual content and a second adaptation component which contains instructions for applying each of the plurality of manipulation functions on a graphical object, selecting between the first and second adaptation components to match a user selection indicative of at least one multidimensional object in a multidimensional presentation space, applying, using a processor, respective the instructions from the selected adaptation component to manipulate the selected at least one multidimensional object in the multidimensional presentation space, and generating presentation instructions for presenting the multidimensional presentation space with the at least one manipulated multidimensional object.

According to some embodiments of the presented invention there is provided a system of grouping views in multidimensional space, optionally recursively. The term view refers to herein to current subset of the scene presentation's content and camera position(s) presenting this current content. Typically, the grouping is hierarchical and/or recursive grouping that is based on semantics of different chapters in the presentation, and/or the like. Optionally, insertion and/or deletion of one or more views is treated in a parenting hosting group, allowing, for example, overlapping views and/or complete separation of views (and as is in contemporary CBPS were each slide is an independent entity).

According to some embodiments of the present invention there is provided a system of creating a presentation of a plurality of multidimensional objects having three dimensions or more in a multidimensional presentation space. The system comprises a processor, a display that presents a multidimensional presentation space having a plurality of multidimensional objects and a plurality of indicators indicative of a plurality of manipulation functions, a user input for receiving from a user a user selection indicative of one of the plurality of multidimensional objects and one of the plurality of manipulation functions, and a manipulation element which extracts a matching adaptation component from a repository which stores a plurality of adaptation components each contains instructions for applying any of the plurality of manipulation functions on a multidimensional object from another of a plurality of different media types and executes, using the processor, respective the instructions to apply the selected manipulation function on the selected multidimensional object.

Optionally, the manipulation element governs the plurality of multidimensional objects under an object-oriented paradigm.

Optionally, each adaptation component is a file containing the executable routines of performing each one of the plurality of manipulation functions of multidimensional objects of a certain media type.

Optionally, further comprising an extension support layer which bridges between the manipulation element and the plurality of adaptation components.

Optionally, each the adaptation component defines a reaction to a plurality of events by a multidimensional object of a respective media type; the manipulation element manages a response to each the event according to a respective the reaction.

According to some embodiments of the present invention there is provided a computerized method of creating a presentation of a plurality of multidimensional objects having three dimensions or more in a multidimensional presentation space. The method comprises providing instructions for implementing a plurality of manipulation functions on a multidimensional object of a predefined media type, providing a plurality of adaptation components of an object-oriented paradigm, each the adaptation component contains instructions for converting an object of one of a plurality of different media types to a multidimensional object of the predefined common representation, receiving a plurality of media objects each of different media types, converting the plurality of objects into a plurality of multidimensional objects of the predefined common multidimensional representation using the instructions, and applying at least some of the plurality of functions on each of the plurality multidimensional objects in the common multidimensional presentation space according to user selection to support a continuous presentation of changes in the multidimensional presentation space.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
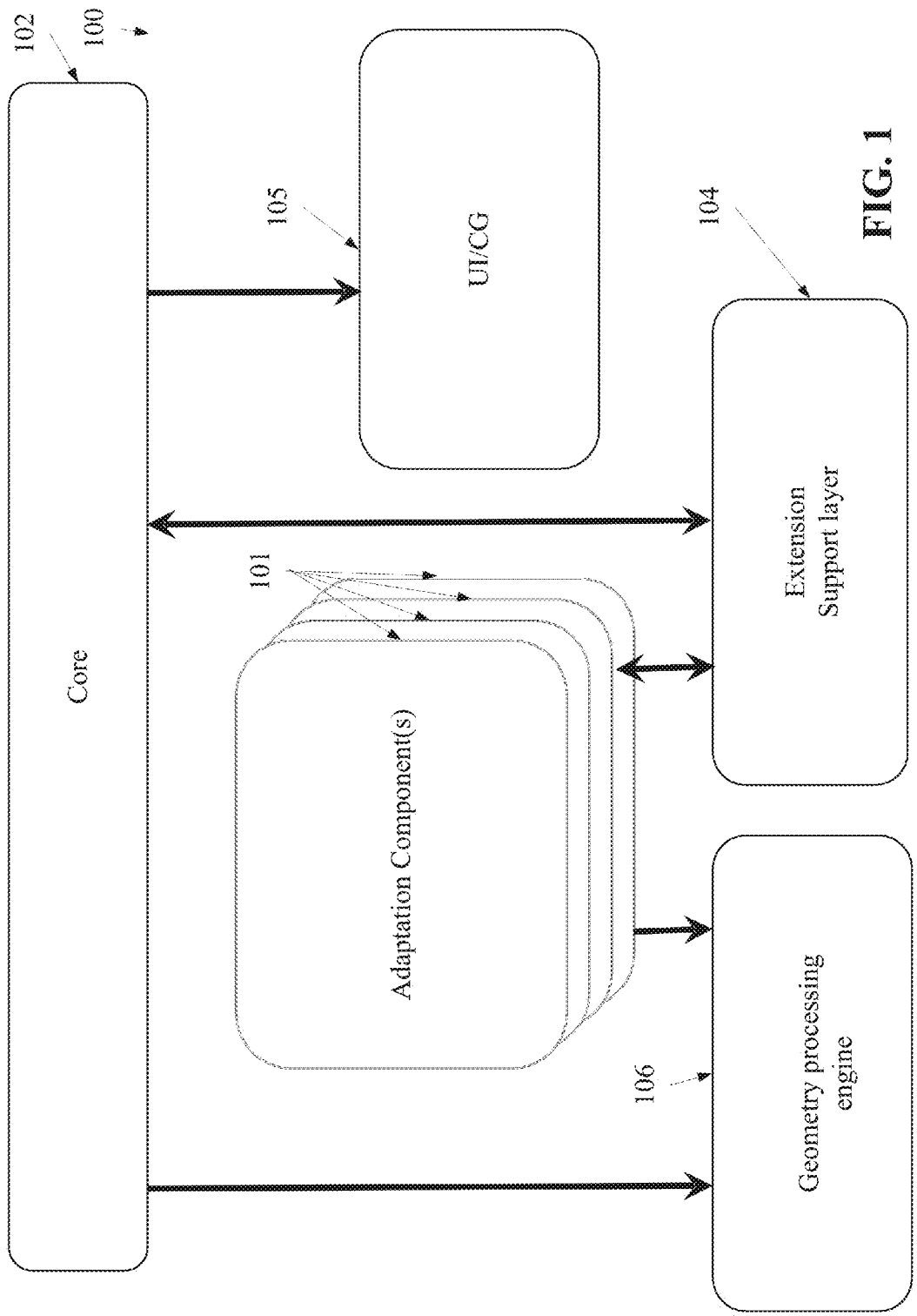
FIG. 1 is a schematic illustration of architecture of a manipulation element for generating a dynamic multidimensional space having three dimensions or more and for spatially and temporally manipulating any multidimensional objects thereof in a consistent and coherent manners, according to some embodiments of the present invention.

The present invention, in some embodiments thereof, relates to data presentation and, more particularly, but not exclusively, to methods and systems for generating a multi dimensional dynamic and interactive presentation.

According to some embodiments of the present invention, there are provided methods and systems of creating a multi-dimensional presentation having three dimensions or more, which optionally changes in the course of a timeline, by allowing a user to select a function to manipulate any of a plurality of multidimensional objects in a dynamic multidimensional presentation space regardless of the media type of the selected multidimensional object. Optionally, the multi-dimensional objects are objects of any of various media types, which are converted to a common multidimensional (geometry) representation. This allows generating a presentation of an interaction between multidimensional objects in a coherent input form and a uniform output (display) manner. Optionally, an object-oriented paradigm is used for implementing the methods and systems. This governs having a basic type inheritance of geometry entities having three dimensions or more in the presentation. In such embodiments, the same function indicator, for example an icon which indicative of resizing, processing, transforming, highlighting and/or deforming geometry, is selected by the user to resize, transform, highlight, process and/or deform various graphic objects having three dimensions or more, such as text content, images, drawings, video files, and/or more geometry elements having three dimensions or more, such as a CT/MRI scan, a cell-phone simulation and/or a mechanical gear simulation. Optionally, video files and mechanical gears have special animation functions that can only be activated on them. A cell-phone may have special functions that simulate its operation, and an MRI/CT scan can have a special function to reevaluate the iso-level surface, given the new threshold level from the user.

It should be noted that the way 2D content is manipulated in contemporary computer based presentation software is not easily amendable to multidimensional presentations having three dimensions or more. When a slide is deleted in a sequential presentation the slide before and after the deleted slide are becoming neighbors. Similarly, a new slide may be intuitively introduced between any two existing slides, due to the sequentially of the presentations; however, in a multidimensional environment having three dimensions or more, total ordering has no clear definition, not to say intuitively. Contemporary computer based presentation software that aim to break the sequentially ceiling either allows a user to insert a new view in the gap between existing two views, with typically a much small scale, and/or forces a user to act out to the boundaries of the scene.

For example, manipulation architecture includes a core environment and a set of plurality of adaptation components, such as dynamic link library (DLL) components, that seamlessly extends the core. As further described below, the set of plurality of adaptation components may be updated without having to rebuild the core environment. In use, the core environment automatically identify which adaptation component is suitable for user selected object(s) and automatically uses one or more routines from the core or the suitable adaptation component to apply on the user selected object(s), optionally following the object-oriented paradigm. In such a manner, geometry in the presentation is defined as graphical multidimensional objects having three dimensions or more, and when a user selects a basic function such as transformation or deformation or change in shading, the same function is applied on textual content and on video files or any other geometry, for example a CT scan. Suitable routines are automatically selected and used to achieve advanced features that may not inherit from the basic graphics type like video playing or mechanical-gear simulation and iso-level extraction from a CT scan. The adaptation component seamlessly extends the core and while the basic functionality is typically provided by the core component, specialized routines in manipulation may be provided by dynamic link library (DLL) components, optionally seamlessly extending a core element.

An architecture representation that includes a core component and adaptation components, which optionally seamlessly extend a core element, is different from a logical presentation that includes basic functions inherited by objects in a presentation. This architecture is also different from specialized functions which may be implemented by adaptation components. Further, basic and/or specialized functions may include input functions (for example, event processing), output functions (for example, display), and/or manipulation functions (for example, deformation or highlighting).

According to some embodiments of the present invention, there is provided a method of creating a presentation of a plurality of multidimensional objects having three dimensions or more in a multidimensional presentation space having three dimensions or more. For brevity, the multidimensional is used to indicate that one or more entities, objects, and/or spaces have three dimensions or more. It should be noted that in some embodiments multidimensional entities and/or objects may be processed with one or more single dimensional objects and/or two dimensional (2D) objects. First, the user is presented with a plurality of indicators of a plurality of manipulation functions. As further described below and outlined above, a plurality of adaptation components are provided, for example stored in an accessible database. Each adaptation component contains instructions for handling, typically specialized, events and applying manipulation functions on multidimensional object(s) of a plurality of different media types. Stated differently, when a user selection indicative of one or more multidimensional object(s) occurs (i.e. an event is generated) a selected manipulation function is activated. This allows generating presentation instructions which allow and include presenting all possible visual modalities that has a geometric representation in multidimensional space, and interact (input), display (output) and manipulate multidimensional object(s) in a coherent fashion.

Additionally or alternatively, each adaptation component contains instructions which allow converting object(s) of a certain media type to a predefined multidimensional object of a predefined type which is supported by the core architecture. In such embodiments, objects of various types are converted in advance to allow applying any of a plurality of functions on the object to create a continuous presentation of changes in the multidimensional presentation space, for example as described below.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a schematic illustration of architecture of a manipulation element 100 for generating a dynamic multidimensional presentation space and for spatially and temporally manipulating multidimensional objects thereof, according to some embodiments of the present invention.

FIG. 1 depicts software modules and records of the manipulation element 100, which are hosted by one or more computing units, for example in a client terminal, such as a laptop, a desktop, a tablet, and/or a cellular phone and/or in a network node, such as a server and/or a network storage.

The dynamic multidimensional presentation space is free of the notion of discrete fixed-size-slides and is optionally a multidimensional scene having a set of 'views'. Further, a change from one 'view' to another can now be done continuously and moreover, one 'view' can subsume another, simply by zooming-out. The dynamic multidimensional presentation evolves over time and may be executed in variable rate, optionally including backward, optionally according to user selection, for example in accordance with the on-the-spot needs. Optionally, dynamic multidimensional presentation space is temporospatial scene that changes over time, and may be stopped and/or inspected from various, optionally any, spatial view direction, optionally at any time. The dynamic multidimensional presentation space generated by the manipulation element 100 allows a user to present the multidimensional objects in non sequential order, according to his/her selection, seemingly moving at arbitrary pace in a scene backward and/or forward, optionally interchangeably, in time and/or space.

Optionally, a plurality of geometry objects of a plurality of media types are a-priori received and converted to common multidimensional representations optionally using a plurality of adaptation components to facilitate a coherent and consistent representation and manipulation, for example as described below. As used herein a manipulation is optionally a geometrical manipulation and/or a non geometrical manipulation. Optionally, dynamic multidimensional presentation space is continuous, without any discrete slides, so that the presentation of the multidimensional objects is not bounded to a certain view but rather displayed from any selected point of view in relation to the dynamic multidimensional presentation space or time or an object therein. For example, a gesture indicative of zoom-out command may adjust the presentation of the dynamic multidimensional presentation space as a whole and a gesture indicative of zoom-in command simply and continuously point on a desired multidimensional object to view. As further described below, a plurality of functions may be applied on one or simultaneously several of the multidimensional objects, regardless of its type, possibly due to reactions to events applied on an object by the user, following the object oriented paradigm. For example, in the dynamic multidimensional presentation space, objects may be moved, erased, made transparent, hidden or visible, shrunken, annotated and/or electronically sketched on. The multidimensional objects may also move in and/or out of a view, increased and/or decreased in size, change visual properties such as color, translucency, and/or texture, deformed in shape into the next needed shape, and/or the like. As the architecture allows the user to apply various function on multidimensional objects, regardless of their original media type, intuitive dynamic changes may be applied in the dynamic multidimensional presentation space, in a coherent and consistent manners.

Reaction to events applied to objects, following an object-oriented presentation paradigm, and/or manipulations of objects are not necessarily graphical and, for example, event(s) can trigger the generation of other event(s), for example can activate some recording process or initiate a dial process in a (multidimensional object representing a) cell-phone or, in general, simulate the behavior of some object.

The architecture depicted in FIG. 1 allows generating a presentation of multidimensional objects which are processed using an object-oriented paradigm. The core component 102 provides basic functionality(ies) to any object that is converted by any of the adaptation components 101. Optionally, the adaptation components 101 have the ability to extend functionality(ies) for special objects providing special functions and/or special events' responses.

Figure 2:
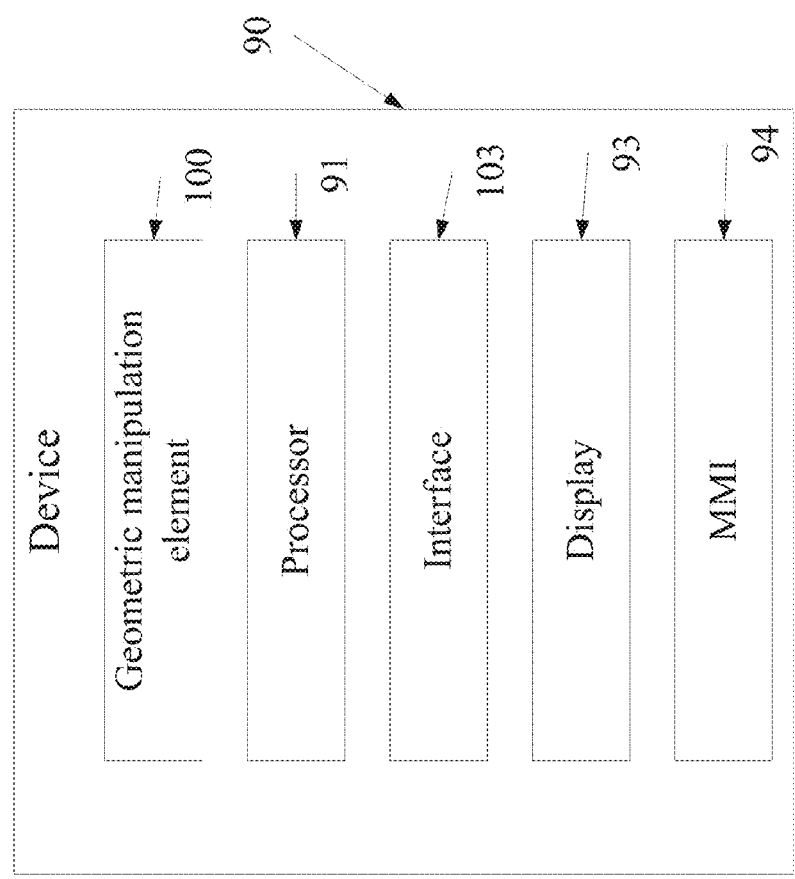
FIG. 2 is a schematic illustration of a device for executing the manipulation element depicted in FIG. 1, according to some embodiments of the present invention.

The implementation of a system which uses the manipulation element 100 facilitates generating a display of a dynamic multidimensional presentation space having a plurality of multidimensional objects and spatially and optionally temporally manipulating the multidimensional objects, regardless of their media type, according to a selected manipulation function and user inputs. In use, the system may generate a dynamic multidimensional presentation space having a plurality of multidimensional objects, present the dynamic multidimensional presentation space, and manipulate the plurality of multidimensional objects therein. For example, a reference is also made to FIG. 2, which is a schematic illustration of a device 90, such as a client terminal or a network node in a cloud, for executing the manipulation element 100, according to some embodiments of the present invention. The device 90 includes a processor 91 that is used by the manipulation element 100 as further described below and an interface 92 that allows updating a database which stores a plurality of adaptation components in the manipulation element 100. As further described below, each one of the adaptation components is adapted for applying a plurality of manipulation functions on multidimensional objects of a certain media type. The device 90, which is optionally a client terminal, further includes a display 93, such as a liquid crystal display (LCD) on a cellular device for presenting the dynamic multidimensional presentation space with the multidimensional objects and a man machine interface (MMI) 94, such as a touch screen, a keyboard, and/or a mouse for intercepting user selection(s).

As depicted in FIG. 1, the manipulation element 100 includes and/or accesses a database of a plurality of adaptation components 101 each adapted for applying a set of manipulation functions on multidimensional objects of a certain type in the dynamic multidimensional presentation space. For example, each adaptation component is a file or a record containing executable routines that allow event processing and executing one or more of the manipulation functions for objects of a certain media type, for example a text segment, an image, a drawing, a video file, a CT scan, a graphical user interface (GUI) widget, and/or the like. For example, the adaptation component is a DLL extension. The database of adaptation components may be uploaded manually by a user and/or automatically, for example from a remote server, either periodically or on demand. This allows the manipulation element 100 to convert a plurality of visible objects of a plurality of different media types into plurality of multidimensional objects of a common type to facilitate coherent manipulation.

For example and demonstrating the concept of a coherent and consistent common (geometry) representation for all media types, reference is now made to the following exemplary adaptation components 101:

1. A text adaptation component—Text in modern computing environments is frequently formed out of outline fonts that are typically represented using Bézier curves based geometry. Known geometric manipulation methods may hence be used for modulating the geometry of a selected multidimensional text according to any of the manipulation functions, such as deform, resize, move, adjust volume, and/or the like. For example, a Bézier curves geometric method, for example as described in Tatiana Surazhsky and Gershon Elber. "Arbitrary precise Orientation Specification for Layout of Text." The eighth Pacific Graphics 2000, Hong Kong, Oct. 3-5, 2000 and Tatiana Surazhsky and Gershon Elber. "Surface Rendering Using Layout of Text." Computer Graphics forum, Vol 21, No 2, pp 99-110 (12), June 2002, which are incorporated herein by reference.

2. Pictures/images and movie/video adaptation component(s)—visual graphic objects, such as images and video images, may be mapped to multidimensional objects using the computer graphics technique known as "parametric textures", over the representing surfaces, for example as described in Edwin Catmull PhD work "A Subdivision Algorithm for Computer Display of Curved Surfaces", University of Utah 1974, and is nowadays used by all computer graphics software like Open GL, which is incorporated herein by reference. Moreover, the presentation of a sequence of images as a movie can also be mapped to a parametric texture on top of an arbitrary multidimensional geometry with similar simplicity, replacing the texture maps n times a second, and with the full support of a graphics processing unit (GPU).

The term common (geometry) representation optionally refers to internal representation of multidimensional (spatial) objects in the core 100, as depicted in FIG. 1, of the open architecture. It should be noted that adaptation components 101 may be developed separately for any media/data type or format, standard or specialization of multidimensional objects. In such a manner, the system may import any multidimensional object, which is optionally animatable over time, for input data types (typically but not necessarily visual) as all modalities are a-priori convertible to a common multidimensional representation. While mostly related to geometry and the visual sense, non-geometric multidimensional objects may be animatable over time. For example, the volume of a background sound-track or the color saturation of some video. This open architecture allows generating adaptation components to synthesize and/or convert any specialized multidimensional (mostly visual) modality into a common multidimensional (geometric) representation that is supported by the core. This obviously includes existing multidimensional geometry (and text/images/movies) but also multidimensional tables and graphs, general drawings and equations, and/or medical data modalities, such as computerized tomography (CT) and magnetic resonance imaging (MRI), statistical data, and/or stock exchange information, all while possibly evolving over time.

During a presentation use, the manipulation element 100 optionally includes a computer graphics programming language interface, such as Open GL, to handle lower level multidimensional graphics rendering and display. The manipulation element 100 further includes GUI tools 105 to allow a user to create events that activate manipulation functions and/or for receiving parameters for applying the manipulation function, for example gesture indicative of geometric deformation, multidimensional object movement and/or the like. Optionally, the manipulation element 100 further includes needed CG libraries and/or tools 105. Optionally, the manipulation element 100 further includes a geometric processing engine 106 for low level handling of multidimensional geometry in the representation used by the core element 102. Such an engine 106 supports the basic operations of processing multidimensional geometry such as rotation, translation, and scale, coloring and texturing, highlighting and/or any other operation controlled and activated by the core element 102.

The manipulation element 100 optionally includes a core environment 102 that conducts upper level multidimensional presentation and interaction management while adaptation components 101, such as DLL external plug-ins, seamlessly extends the core environment 102 to manipulate specialized multidimensional objects according to any of the manipulation functions.

For example, the adaptation components 101 may include one or more of the following:

1. Creation and Conversion of multidimensional content function—a function that allows converting or synthesizing any of the object types having an adaptation component associated therewith (i.e. text, images, diagrams, equations, CT/MRI data, stock exchange data, and/or multidimensional (geometry) in a variety of formats), into multidimensional geometric object in the dynamic multidimensional presentation space, and vice versa, offering an exporting facility. It should be noted here that while we focus on common geometry representation, the same holds for different media types such as sound formats, video formats, and/or the like.

2. Specialized 'melting' deformation of multidimensional content function—a function that allows manipulating objects of any type having an adaptation component associated therewith, optionally depending on the location thereof in the dynamic multidimensional presentation space and/or according to a certain period in a timeline.

3. Event handling content function—the user or objects can synthesize basic events such as zoom-in, change view, object selection, object movement, object enlargement, and/or object deformation that are supported and handled by the core component 102 or specialized events that only designated adaptation components 101 may process (i.e. checker pieces' motion can synthesize unique events that only checker's playing adaptation component processes). An event handling function can allow defining a reaction to (possibly specialized) event(s) for any of the object types having an adaptation component associated therewith. Optionally, the function may synthesize new events and forward them to the core environment 102 that uses respective adaptation component as event handlers. The respective adaptation component is optionally tailored to handle specialized, possibly application dependent, event(s), having the encoding to execute a desired reaction. The respective adaptation component may include routines which are adjusted for specific objects. For instance, a click on an object may initiate a custom made animation and a click on a 'dial' button, will initialize some dialing process. Being an open architecture, the reaction to an event can be anything one can imagine, including the generation of other event.

4. A scripting language interface to presentations—the adaptation component is a plug-in that is linked to a scripting language interpreter, such as Python™, that is registered to receive and identify events and to invoke accordingly a suitable script. Having a scripting ability reduces the coding level barrier from a compiling language (i.e., C or C++) to that of a scripting language, making a programmable user interface (PUI) path available for end users.

5. An adaptation component element 101 that is used as an emulator that realistically simulates an interactive multidimensional element, for example a simulation of a new electronic device, such as a cellular phone or a fresh software package. In use, events are received with relation to the presented dynamic multidimensional presentation space (i.e. clicks on a multidimensional virtual model), for example from the core environment 102 or from a virtual front-end GUI panel. The events are processed according to this respective adaption component that functions as an emulator. The adaption component may interface with external real hardware and/or software, possibly at a remote site, for example in order to simulate a real world counterpart of the interactive multidimensional element.

6. Alternatively. The adaptation component can control external hardware, which is designed, for example, for presenting sounds, tactile stimulations and/or scents, and that may be activated and controlled in response to events derived directly from the user or by interaction with some objects in the dynamic multidimensional scene. The adaptation components, such as plug-ins, can interface with application program interfaces (APIs) of sound, haptic and/or scent-spreading devices. In such a manner, these devices may be synchronized with a certain timeline and/or dynamic changes in the dynamic multidimensional scene, playing a desired music, generating a scent suitable to a displayed scene, and/or provide a tactile stimulation which emulates a tactile stimulation of touching an object displayed in the dynamic multidimensional scene.

7. Optionally, the manipulation element 101 includes a recording module which records the presentation of the dynamic multidimensional presentation space during a period. The recording allows creating a presentation timeline at which specific multidimensional objects are manipulated, for example using the aforementioned functions, at specific time slots. Events and changes in the scene depicted by the dynamic multidimensional presentation space are also captured, for example point of view changes, annotations, object attribute changes, or even electronic ink write-ups and/or sketches on whiteboards. Such a recording may be stored with time stamp(s) to create a play-list for the presentation that can be repeated as desired, and at any pace.

8. Optionally, an input adaptation component, such as a plug-in, may be defined to capture multidimensional input gestures (e.g. via a motion sensing device, such as Kinect™), electronic writing pad gestures, and/or gyroscope or accelerometers outputs of a handheld client terminal, such as a cellular phone. The manipulation may be indicative of a next view commend, a zoom out commend, a continuously turn left at some pace commend, and/or the like. Similarly, the electronic writing pad can be registered to a whiteboard in the presentation and everything sketched on the pad will be shown on the dynamic multidimensional presentation space, which may function as a virtual whiteboard. The input adaptation component(s) may define a communication for receiving inputs, for example via a Bluetooth™ connection. The input adaptation component(s) optionally generates instructions to the core environment.

9. Optionally, an input adaptation component, such as a plug-in, may be defined to capture real time data (i.e. stock-exchange data or electricity-usage in a power plant) and update the presentation, again in real time, with the continuously captured data.

Optionally, in order to allow the seamless integrating a new adaptation components 101 into the core manipulation element 102 without rebuilding the core environment 102, an extension interface support layer 104, for example implemented as another DLL layer, is defined. This layer 104 serves as a bridge between the core environment 102 and the external plug-ins 101. This layer 104 optionally defines and encapsulates the precise API protocol that the adaptation components 101 may use. Optionally, the extension support layer 104 has access to all operations of the core environment 102 and creates a logically seamless extension of the core.

Figure 3:
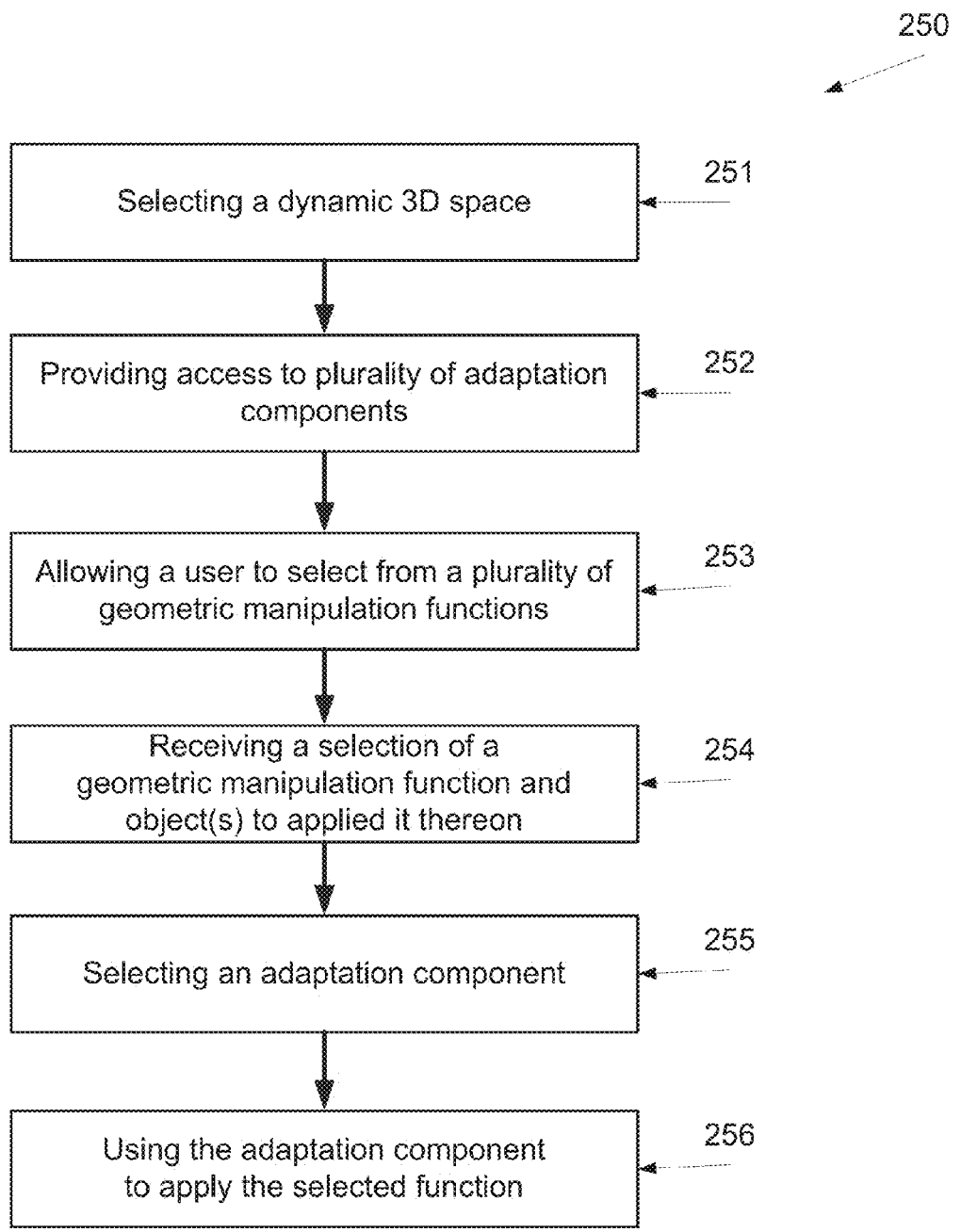
FIG. 3 is a flowchart of a computerized method of coherently and consistently manipulating multidimensional objects in a dynamic multidimensional presentation space, for example while generating a multidimensional presentation space, according to some embodiments of the present invention.

For example, reference is now made to FIG. 3, which is a flowchart 250 of a computerized method of manipulating multidimensional objects in a dynamic multidimensional presentation space, for example while generating a multidimensional presentation space, according to some embodiments of the present invention.

First, as shown at 251, a dynamic multidimensional presentation space having a plurality of multidimensional objects is created. The dynamic multidimensional presentation space may be a template of a virtual space to which multidimensional objects which are selected by users are added. The dynamic multidimensional presentation space is optionally presented in a workspace managed by the manipulation element 100. In use, the user may define, select and/or upload multidimensional objects, such as text, images, drawings, molecule models, MRI scans, and/or video files to be added to the dynamic multidimensional presentation space. These multidimensional objects are optionally added to the dynamic multidimensional presentation space simultaneously and/or sequentially. Optionally, the multidimensional objects are converted objects of various file types. By an a-priori conversion of visual objects of different type to a common multidimensional representation, the objects can be equally processed as multidimensional geometric objects over time in a coherent manner, for example during and/or before a presentation.

As shown at 252, a plurality of adaptation components, such as 101, are provided, for example made accessible. Each adaptation component allows applying any of a set of manipulation functions on a multidimensional object of a certain media type. For example, one adaptation component may be adapted for text, another for images, and an additional one to sketching.

As shown at 253, indications of manipulation functions are presented to the user of the workspace, for example as icons, selectable items of lists, possibly associated with some objects, or tables and/or the like. Each function is set to manipulate one or more selected multidimensional objects.

Optionally, as shown at 254, the user selects one or more multidimensional objects, for example by mouse-clicking thereon, and then chooses one of the manipulation functions to apply thereon. As shown at 255, the adaptation component that is suitable to handle multidimensional objects of the type of the selected multidimensional object is automatically selected, for example by analyzing identifiers of the object, such as type, file suffix, size, and/or any other classification means which are known in the art.

Now, as shown at 256, the automatically selected adaptation component is accessed to facilitate manipulation of the selected object according to the selected object manipulation function and the user inputs. The selected basic object manipulation function is applied according to instructions indicative of implementing the respective function from the automatically selected adaptation component.

Figure 4:
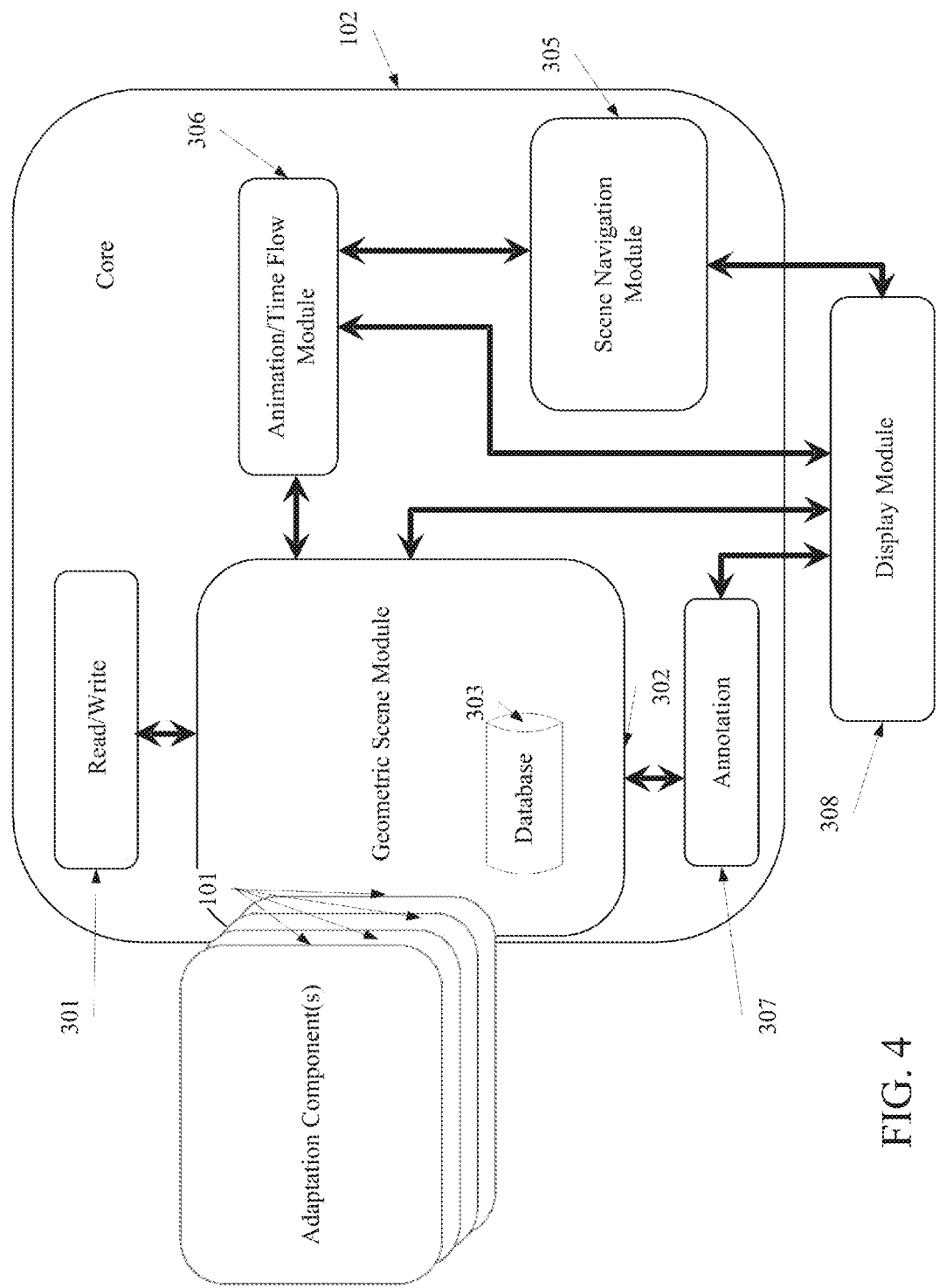
FIG. 4 is a schematic illustration of an exemplary architecture of the core environment, according to some embodiments of the present invention.

Reference is now also made to FIG. 4, which is a schematic illustration of an exemplary architecture of the core environment 102, according to some embodiments of the present invention. In this architecture, the core environment 102 includes the following sub-modules:

1. A read/write module 301—this module 301 that handles presentation of objects in the dynamic multidimensional presentation space. For example, the module handles read, write, import, and/or export commands of, for example, geometry and/or presentations. The presentation module 301 optionally imports format(s), such as OBJ, IGES and STEP for geometry as well as open office format, office open extensible markup language (XML) files, for example pptx files of PowerPoint™ that allows saving presentations in any format, for example an internal format, and/or exports presentations to other environments such as the world wide web, possibly using WebGL.

2. A scene module 302—as described above, the manipulation element 102 allows presenting a dynamic multidimensional presentation space with a plurality of objects as a homogeneous multidimensional scene that allows presenting one or more subjects using continuous 'views' (and without using discrete fixed-size-slides). The homogeneous multidimensional scene may be divided into context based chapters, showing any view at any moment of time. Optionally, the multidimensional objects, which are spread out in dynamic multidimensional presentation space, have behavior(s). This module 302 also manages and supports the behaviors of the objects. Optionally, at a basic event level, the scene module includes a database 303 indicative of one or more reactions for each of one or more events. The scene module 302 applies reactions based on events identified according to the database. At an additional level, a local event that is not documented in the database 303 or an event that is registered to be forwarded to an external adaptation component, is forwarded to the external event handler of each one of the adaptation components 101 in order, only to stop at the first external event handler that is able to handle the event, declare so and react. Optionally, the database 303 is updated with a reaction which includes referring to the suitable external event handler. Similarly, global events might request the reaction of all handlers that support a specific event. All the adaptation components 101 are optionally seamlessly integrated into the database 303 or interface therewith through the extension support layer 104.

Figure 5:
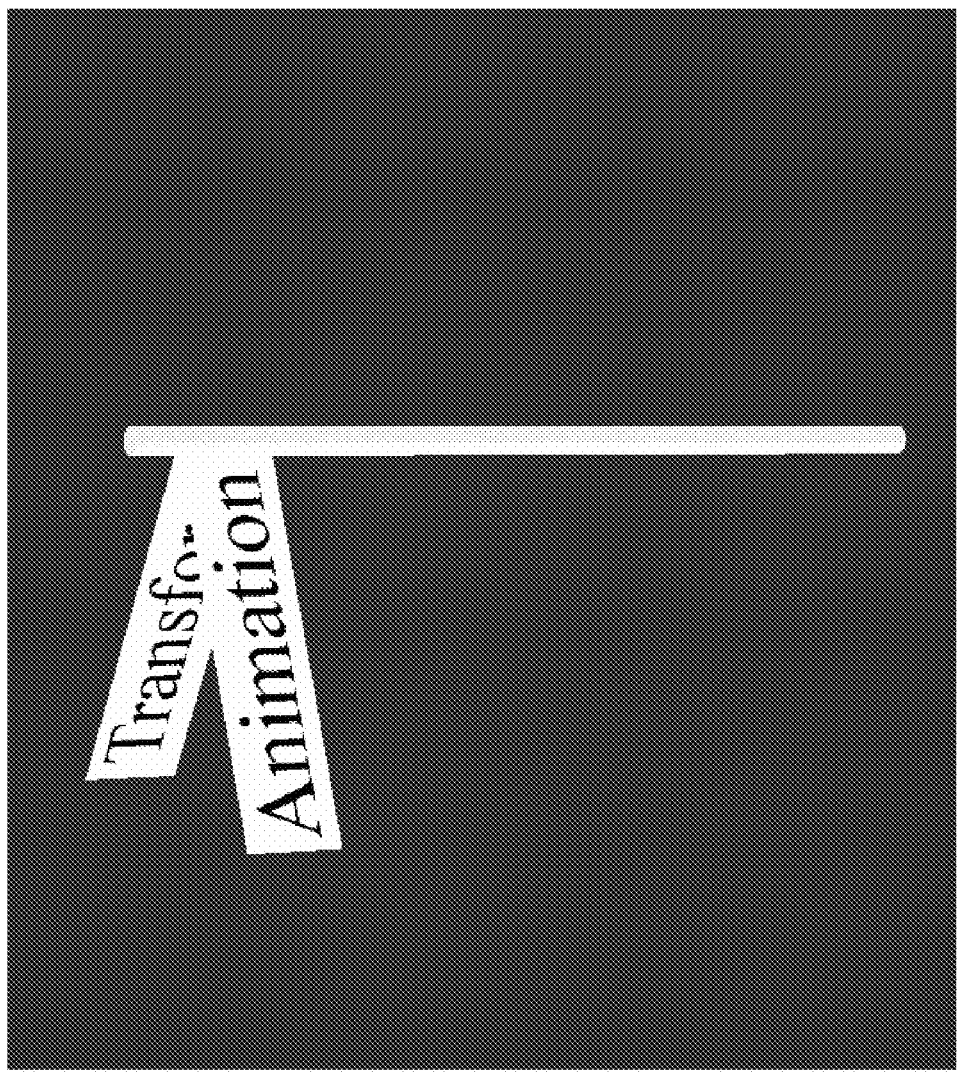
FIG. 5 is a schematic illustration of an exemplary multidimensional graphical user interface which may be added to a multidimensional presentation, according to some embodiments of the present invention.

3. A scene navigation module 305—this module includes tools to continuously navigate intuitively in a scene, for example in space and/or time, and to tailor predefined spatial and/or temporal anchors for ease of transition during actual presentation. For example, each spatial anchor defines specifications of a virtual camera depicting the dynamic multidimensional presentation space from a selected location and/or angle. A time-anchor allows an operator to go through specific periods in a timeline during a presentation of the dynamic multidimensional presentation space. This module also allows an end user to transform multidimensional geometry and to define rigid motion and basic animation, together with the animation module, of multidimensional geometry over time. This module 305 includes an ability to reposition not only all regular objects in the scene but also special objects such as spatial and time-anchors, controlling which views spectators may use, and/or light sources, affecting the lighting of the scene at any given moment along a timeline. The fact that navigation in multi-dimensions is quite natural to humans can be reflected with little difficulty in this proposed paradigm. Non-sequential traversal of the presentation may be controlled with ease by adding, for example, street-signs as shown in FIG. 5 and a specialized function to the signs' objects to move to the transformation or animation views in a response to a mouse click-event on the different signs. It should be noted that non-sequential presentation traversal in multidimensional may be made as natural as sequential navigation which is commonly imposed by CBPS, for example by a zoom out and selection of a multidimensional object, activating the object's primary associated view.

4. An animation and time flow control module 306—this module allows a user to define a natural flow of progression in the dynamic multidimensional presentation space over time. When planning the dynamic multidimensional presentation space, views may be defined along a natural path also referred to herein as a timeline. Optionally, several alternative paths are defined and optionally mapped as a tree or a web, using, for example, street-signs. Optionally, this module 306 provides the tools to define rigid motion animation (together with the navigation module) of all objects in the scene and controls a flow of time (progression of the presentation). It should be noted that animation does not necessarily mean motion (i.e. gear simulation). One can also animate the color of a multidimensional object or its opacity. All animations are a function of all dimensions. For example, for a 3D object, this can mean, 3-space and time, and the object can change its opacity based on either its position or the current time (or both). An almost transparent object positioned on the side, which is barely visible to the audience, can be dragged or animated to the center of the presentation and become opaque and visible, when translucency is controlled by the location of the object. Finally, animations are not necessarily applied to multidimensional geometry. For example, volume of a sound track may be animated over time as is the color saturation of some video.

5. Annotation tools 307—these tools 307 provide abilities to annotate multidimensional objects with arbitrary other objects, such as arrows and markers, and allow coloring, glowing and highlighting, hiding, (un)grouping, and showing objects or making them transparent, and/or the like.

6. A display module 308—a module 308 that manages the display of the dynamic multidimensional presentation space. The module also handles additional information, such as lecturers' notes and auxiliary data, optionally synthesizing different views for the lecturer and the audience.

Figure 6A:
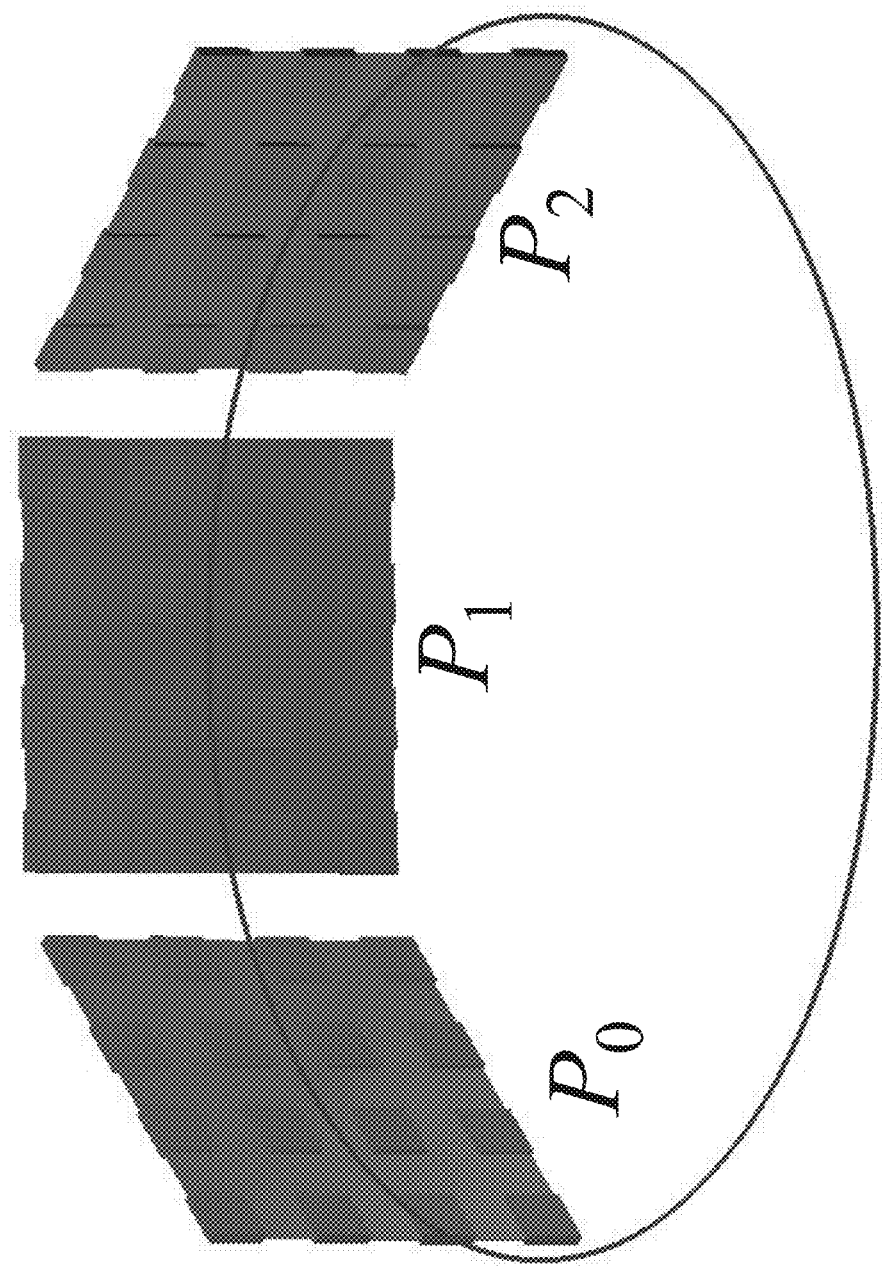
FIGS. 6A and 6B are respectively exemplary grouping of views in a 2D grid and an exemplary tiling of views in bivariate hemi-spheres, according to some embodiments of the present invention.
Figure 6B:
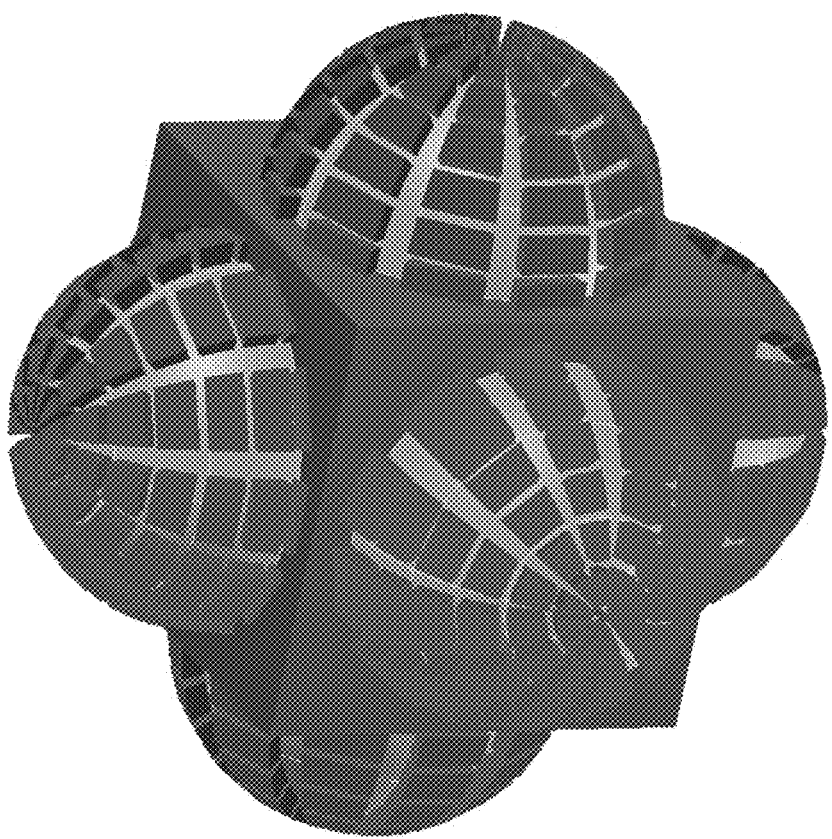

It should be noted that editing a scene in a multidimensional presentation three dimensions or more is more complex than the plane 2D case of contemporary CBPS, inter alia as no total order exists. As the multidimensional space may be tiled with views, we consider grouping views along curves (univariates), surfaces (bivariates), trivariates, and multivariate functions. Optionally, the system recursively positions any of the above groups-of-views along other curves (univariates), surfaces (bivariates), trivariates, and multivariate functions. FIG. 6A depicts an exemplary grouping of views in a 2D grid, in planar bivariate vertical surfaces, $P_i$, in $R^3$ and several such $P_i$'s may be positioned in space along a univariate circle tiling portions of $R^3$. FIG. 6B, depicts an exemplary tiling of views in bivariate hemi-spheres, inspecting the views from the spheres' center, while the hemi-spheres is positioned on six bivariate faces of a cube. Typically, such a hierarchy of groups-of-views has semantics of different sections and/or chapters in the presentation, and/or the like. Insertion and/or deletion of a view and/or a group-of-views may be reduced, for example, to solving a diffusion and/or potential field problem, having n particles (views) on the hosting univariate, bivariate, trivariate and/or multivariate variety representing the views after the insertion/deletion operations resides on, and possible each view's content is bounded by a hyper-sphere. Further, in some cases, overlapping views are desired, in which case the relevant particles (views) share a lower potential, and/or the like.

It is expected that during the life of a patent maturing from this application many relevant systems and methods will be developed and the scope of the term computing system, device, system and network is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 and/or the like, as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method of creating a presentation of a plurality of multi dimensional objects having at least three dimensions in a multidimensional presentation space, comprising:
providing a core element which applies any of a plurality of manipulation functions on a common internal representation type of a multidimensional object in a multidimensional presentation space having at least three dimensions, wherein said common internal representation type comprises at least three dimensions;
providing a plurality of adaptation components each contains instructions for converting any media object having at least three dimensions of another of a plurality of different media types to said common internal representation type of a multidimensional object in said multidimensional presentation space;
receiving a media object having at least three dimensions;
bridging between a manipulation element and said plurality of adaptation components using an extension support layer to allow said manipulation element to identify a matching adaptation component from a repository which stores said plurality of adaptation components according to a respective media type of said media object;
converting said received media object into a certain multidimensional object of said common internal representation type in said multidimensional presentation space using said matching adaptation component; and
applying any of said plurality of functions on said certain multidimensional object, using said core element, according to a user selection;
wherein:
(i) at least some of the plurality of adaptation components are implemented as external plug-ins;
(ii) said extension support layer is implemented as a specialized routine which defines and encapsulates a precise API protocol used by at least some of the adaptation components; and
(iii) said extension support layer has access to all operations of said core element to create a logical extension of the core element: said core element applies any of the plurality of the manipulation functions on the common internal representation type of the multidimensional object.

2. The method of claim 1, wherein said plurality of manipulation functions comprise a member of a group consisting of: an object selection function, an object movement function, an object enlargement function, an object deformation function, an object animation function, a scene navigation function, and a reaction to an identified event.

3. The method of claim 1, wherein each said adaptation component comprises instructions to manipulate another member of a group consisting of: text, an image, a drawing, a video file, a medical scan, a mechanical or biological model, a diagram, or other visual computer graphic (CG) element.

4. The method of claim 1, further comprising updating a display of said multidimensional presentation space to display the outcome of applying one of said plurality of functions on said certain multidimensional object.

5. The method of claim 1, wherein said applying comprises applying a plurality of said plurality of functions on said certain multidimensional object, using said core element, according to a plurality of user selections so as to allow presenting continuous changes to said multidimensional presentation space.

6. The method of claim 1, further comprising animating said multidimensional presentation space according to said applied function.

7. The method of claim 1, wherein a plurality of views in said presentation are recursively placed along a member of group consisting of a curve, a surface, and a space represented by a multivariate function, recursively.

8. The method of claim 7, wherein said plurality of views are at least one of added, modified, and removed using at least one of diffusion and potential field over a variety between the views.

9. The method of claim 1, wherein said presentation instructions allows presenting in real time a plurality of continuous changes in said multidimensional presentation space.

10. The method of claim 1, further comprising allowing a user to navigate in said multidimensional presentation space.

11. The method of claim 10, wherein said allowing comprises allowing said user to zoom in into said certain multidimensional object that is primarily associated with a desired new view.

12. The method of claim 11, further comprising updating a display of said multidimensional presentation space to display the outcome of applying one of said plurality of functions on said certain multidimensional object;
wherein said allowing comprises selecting said certain multidimensional object as a multidimensional object primarily associated with the desired new view and switching the display to said desired new view.

13. The method of claim 1, further comprising uploading by a user at least one new adaptation component to said plurality of adaptation components, wherein said at least one new adaptation component extends said core element to apply any of said plurality of manipulation functions on at least one new media object type.

14. A non-transitory computer readable medium comprising computer executable instructions adapted to perform the method of claim 6.

15. A computerized method of creating a presentation of a plurality of multidimensional objects in a multidimensional presentation scene, comprising:
presenting to a user with indicators of a plurality of manipulation functions of a core element, said core element is adapted to apply any of said plurality of manipulation functions on a common internal representation type of a multidimensional object, each of said plurality of manipulation function operating on said common internal representation type, wherein said common internal representation type comprises at least three dimensions;
providing a plurality of adaptation components each contains instructions for applying each of said plurality of manipulation functions on a multidimensional object having at least three dimensions of another of a plurality of different media types, wherein said multidimensional object is of said common internal representation type;

receiving a user selection indicative of at least one of a plurality of multidimensional objects in a multidimensional presentation space having at least three dimensions and of one of said plurality of manipulation functions;

bridging between a manipulation element and said plurality of adaptation components using an extension support layer to allow said manipulation element to identify a matching adaptation component from a repository that stores said plurality of adaptation components according to a respective media type of said at least one multidimensional object of said common internal representation type;

applying, using a processor, respective said instructions from said matching adaptation component to manipulate said selected multidimensional object according to said selected manipulation function; and generating presentation instructions of said multidimensional presentation space with said manipulated multidimensional object;

wherein:
(i) at least some of the plurality of adaptation components are implementer external plug-ins;
(ii) said extension support layer is implemented as a specialized routine which defines and encapsulates a precise API protocol used by at least some of the adaptation components; and
(iii) said extension support layer has access to all operations of said core element to create a logical extension of the core element: said core element applies any of the plurality of the manipulation functions on the common internal representation type of the multidimensional object.

16. The method of claim 15, wherein said receiving comprises receiving a plurality of objects of a plurality of media types and converting said plurality of objects into said multidimensional common representation object using said plurality of adaptation components.

17. The method of claim 15, wherein said plurality of manipulation functions comprise members of a group consisting of object selection, object movement, object enlargement, object deformation, object animation, scene navigation, and a reaction to an identified event.

18. The method of claim 15, wherein each said adaptation component comprises instructions to manipulate another member of a group consisting of: text, an image, a drawing, a video file, a medical scan, a mechanical or biological model, a diagram, or other visual computer graphic (CG) element.

19. The method of claim 15, wherein said plurality of multidimensional objects comprises at least one text object and at least one visual computer graphics object.

20. The method of claim 15, wherein said generating comprises recording a display of said multidimensional presentation space while said selected multidimensional object is manipulated according to said respective instructions.

21. The method of claim 15, wherein said instructions define when to manipulate said selected multidimensional object along a timeline; said presentation instructions are adapted to instruct the presentation of a manipulation of said multidimensional object according to said timeline.

22. The method of claim 15, wherein said user selection indicative of a period in a timeline wherein a manipulation should occur according to said selected manipulation function.

23. The method of claim 15, further comprising interfacing with a hardware component using hardware component interface instructions in said matching adaptation component according to said user selection.

24. The method of claim 15, wherein said at least one multidimensional object comprises a plurality of multidimensional objects of different media types.

25. The method of claim 15, wherein boundaries of said multidimensional presentation space limits manipulation of said selected multidimensional object.

26. The method of claim 15, wherein said presentation instructions allows presenting continuous changes to said multidimensional presentation space, using at least one adaptation component, in real time.

27. The method of claim 15, wherein said presentation instructions allows presenting a non sequential path of changes in said multidimensional presentation space.

28. The method of claim 15, wherein said presentation instructions animate said multidimensional presentation space.

29. A system of creating a presentation of a plurality of multidimensional objects having at least three dimensions in a multidimensional presentation space, comprising:
a processor;
a display that presents a multidimensional presentation space having a plurality of multidimensional objects of a common internal representation type and a plurality of indicators indicative of a plurality of manipulation functions on said common internal representation type, wherein said common internal representation type comprises at least three dimensions;
a user input for receiving from a user a user selection indicative of one of said plurality of multidimensional objects and one of said plurality of manipulation functions; and
a manipulation element which extracts a matching adaptation component from a repository which stores a plurality of adaptation components each contains instructions for applying any of said plurality of manipulation functions on a multidimensional object from another of a plurality of different media types and executes, using said processor, respective said instructions to apply said selected manipulation function on said selected multidimensional object according to said common internal representation type;
an extension support layer which bridges between said manipulation element and said plurality of adaptation components wherein:
(i) at least some of the plurality of adaptation components are implemented as external plug-ins;
(ii) said extension support layer is implemented as a specialized routine which defines and encapsulates a precise API protocol used by at least some of the adaptation components; and
(iii) said extension support layer has access to all operations of a core element to create a logical extension of the core element; said core element applies any of the plurality of the manipulation functions on the common internal representation type of multidimensional object.

30. The system of claim 29, wherein said manipulation element governs said plurality of multidimensional objects under an object-oriented paradigm.

31. The system of claim 29, wherein each said adaptation component is a file containing the executable routines of performing each one of said plurality of manipulation functions of multidimensional objects of a certain media type.

32. The system of claim 29, wherein each said adaptation component defines a reaction to a plurality of events by a multidimensional object of a respective media type; said manipulation element manages a response to each said event according to a respective said reaction.

* * * * *